United States Patent
Tseng

(10) Patent No.: US 8,129,923 B2
(45) Date of Patent: Mar. 6, 2012

(54) SWITCHING CIRCUIT ADAPTED IN LED CIRCUIT

(75) Inventor: Kuan-Jen Tseng, Sinshih Township, Tainan County (TW)

(73) Assignee: Himax Analogic, Inc., Tainan County (TW)

( * ) Notice: Subject to any disclaimer, the term of this patent is extended or adjusted under 35 U.S.C. 154(b) by 302 days.

(21) Appl. No.: 12/577,969

(22) Filed: Oct. 13, 2009

(65) Prior Publication Data

US 2011/0084625 A1    Apr. 14, 2011

(51) Int. Cl.
| G05F 1/00 | (2006.01) |
| H05B 37/02 | (2006.01) |
| H05B 39/04 | (2006.01) |
| H05B 41/36 | (2006.01) |
| H05B 39/02 | (2006.01) |
| H05B 37/00 | (2006.01) |
| H05B 39/00 | (2006.01) |
| H05B 41/00 | (2006.01) |

(52) U.S. Cl. ............... 315/291; 315/209 R; 315/294; 315/297; 315/307; 315/312

(58) Field of Classification Search .......... None
See application file for complete search history.

(56) References Cited

U.S. PATENT DOCUMENTS

| 5,814,981 A * | 9/1998 | Tsuchi et al. ............... 323/369 |
| 6,774,612 B1 * | 8/2004 | Ballenger et al. ........... 323/303 |
| 7,057,359 B2 * | 6/2006 | Hung et al. ................. 315/291 |
| 2008/0036519 A1 * | 2/2008 | Kang ............................ 327/308 |
| 2008/0278092 A1 * | 11/2008 | Lys et al. ..................... 315/247 |

OTHER PUBLICATIONS

Robert W. Newcomb, "Circuit (electronics)", Access Science, McGraw Hill, 2008 [retrieved on Sep. 30, 2011]. Retrieved from the Internet <URL: http://accessscience.com/content/Circuit%20(electronics)/137000>.*

* cited by examiner

*Primary Examiner* — Douglas W Owens
*Assistant Examiner* — Dedei K Hammond
(74) *Attorney, Agent, or Firm* — Thomas, Kayden, Horstemeyer & Risley, LLP

(57) ABSTRACT

A switching circuit adapted in an LED circuit and an LED circuit are provided. The switching circuit has a mode-selecting circuit, a comparator and a control module. The mode-selecting circuit has a voltage-dividing module and a switch. The voltage-dividing module receives and divides a reference voltage to further generate a working voltage. The switch is connected to the voltage-dividing module, wherein the switch has an output. The comparator comprises a first input connected to the switch, a second input and a comparator output. During a measuring mode, the switch transfers the reference voltage and the second input is connected to the comparator output. During a working mode, the switch transfers the working voltage, the second input of the comparator receives an output voltage of the LED circuit and the control module generates a control signal according to the voltage of the comparator output to switch the LED circuit.

12 Claims, 3 Drawing Sheets

SWITCHING CIRCUIT ADAPTED IN LED CIRCUIT

BACKGROUND

1. Technical Field

The present disclosure relates to a switching circuit. More particularly, the present disclosure relates to a switching circuit adapted in an LED circuit.

2. Description of Related Art

LEDs are estimated to be four times as efficient as conventional incandescent lights. They are also claimed to be more economically sound than compact fluorescent bulbs that contain harmful mercury and are supposed to last a lot longer than the conventional lighting. Thus, LEDs may become the mainstream of the lighting technology.

The switching circuit in the LED circuit performs charging and discharging activities on the LEDs. The conventional design of the LED circuit has a load connected to the output of the LEDs. In order not to have too much power dissipation on the load, a feedback mechanism is used to connect the output with a comparator to lock the output voltage of the LEDs at a pre-determined value, which is a small value, to lower the power dissipation. In order to match the pre-determined value, the comparator is used to compare the output voltage to a reference voltage, wherein the reference voltage is set to be the pre-determined value. Therefore, the reference voltage needs to be precise. A measuring process of the reference voltage is performed to make sure that the reference voltage doesn't deviate from the pre-determined value too much. However, an error is easily generated during the measuring process because the output voltage is too small and is easy to be affected by the measuring device, such as a probe. Therefore, it's hard to check the precision of the reference voltage.

Accordingly, what is needed is a switching circuit adapted in an LED circuit with a precision-checking mechanism to provide a compensation mechanism without losing of the linearity.

SUMMARY

A switching circuit adapted in an LED circuit is provided. The switching circuit has a mode-selecting circuit, a comparator and a control module. The mode-selecting circuit has a voltage-dividing module and a switch. The voltage-dividing module receives and divides a reference voltage to further generate a working voltage. The switch is connected to the voltage-dividing module, wherein the switch has an output. The comparator comprises a first input connected to the switch, a second input and a comparator output. During a measuring mode, the switch transfers the reference voltage and the second input of the comparator is connected to the comparator output. During a working mode, the switch transfers the working voltage, the second input of the comparator receives an output voltage of the LED circuit, and the control module generates a control signal according to the voltage of the comparator output to switch the LED circuit.

Another aspect of the present disclosure is to provide an LED circuit. The LED circuit has a load, a group of LEDs, a switching circuit and a power MOSFET. The load is connected to a ground potential. The group of LEDs has an input point connected to the supply voltage and an output point connected to the load. The switching circuit has a mode-selecting circuit, a comparator and a control module. The mode-selecting circuit has a voltage-dividing module and a switch. The voltage-dividing module is to receive and divide a reference voltage to further generate a working voltage. The switch is connected to the voltage-dividing module, wherein the switch has an output. The comparator comprises a first input connected to the switch, a second input and a comparator output. During a measuring mode, the switch transfers the reference voltage, and the second input of the comparator is connected to the comparator output. During a working mode, the switch transfers the working voltage, the second input of the comparator receives an output voltage of the output point of the group of LEDs and the control module generates a control signal according to the voltage of the comparator output to control the power MOSFET to switch the LED circuit.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
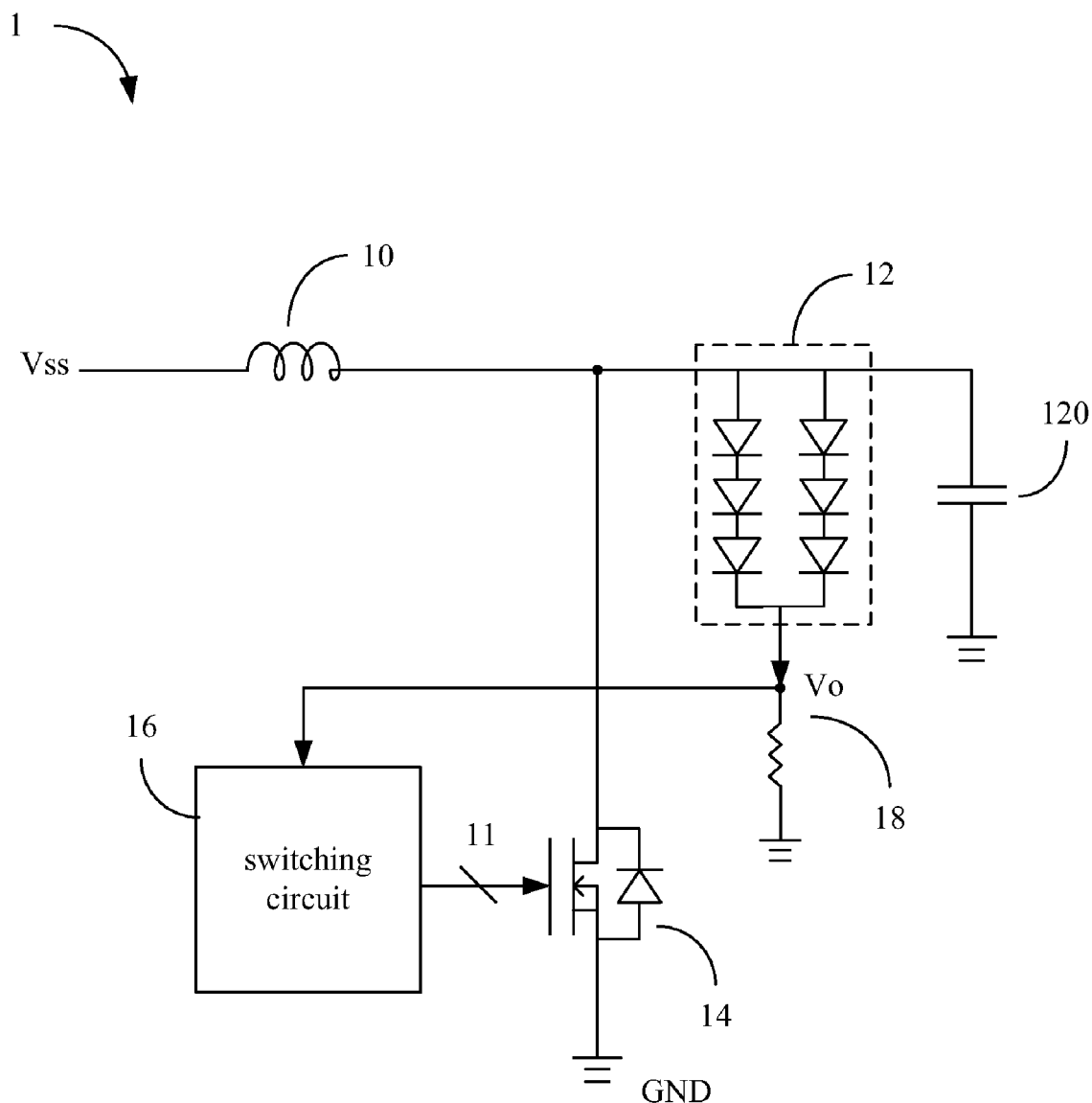
FIG. 1 is a diagram depicting an LED circuit of an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Please refer to FIG. 1. FIG. 1 is a diagram depicting an LED circuit 1 of an embodiment of the present disclosure. The LED circuit 1 comprises an inductor 10, a group of LEDs 12, a power MOSFET 14, a switching circuit 16 and a load 18. The inductor 10 is connected to a voltage supply Vss to stabilize the voltage. In other embodiment, the inductor 10 may not be a necessary element. The input point of the group of LEDs 12 is connected to the inductor 10, while the output point is connected to the load 18. The output point has an output voltage Vo. The load 18 is further connected to a ground potential GND.

The power MOSFET 14 is connected to the input point of the group of LEDs 12 and the ground potential GND. The switching circuit 16 generates a control signal 11 to control the gate of the power MOSFET 14. The LED circuit 1 further comprises a capacitor 120 to allow the switching circuit 16 performing charging and discharging activities. When the control signal 11 turns on the power MOSFET 14, the power MOSFET 14 starts to charge the capacitor 120 to further turn on the group of LEDs 12. When the control signal 11 turns off the power MOSFET 14, the capacitor 120 starts to discharge to further turn off the group of LEDs 12.

Figure 2:
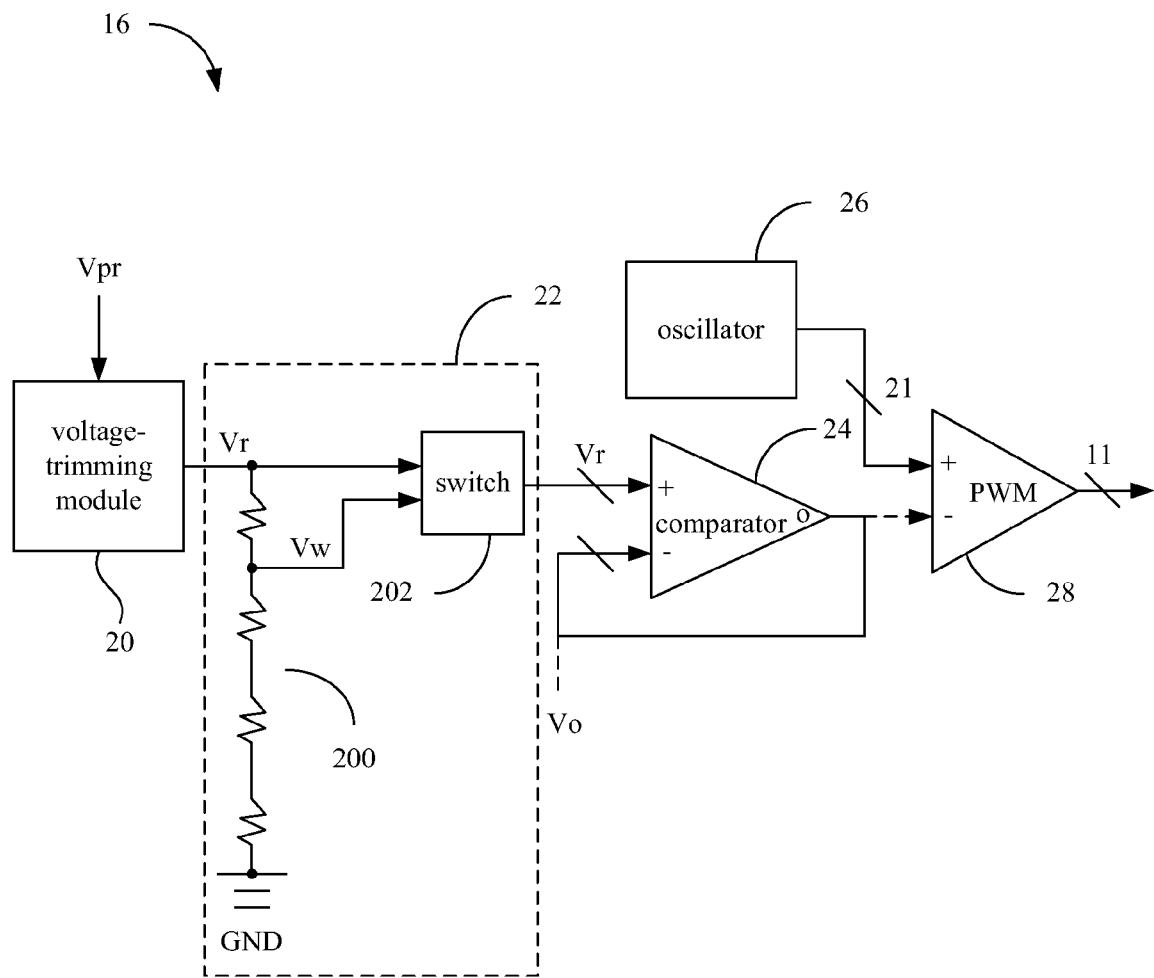
FIG. 2 is a diagram of the switching circuit in the measuring mode of an embodiment of the present disclosure.

Please refer to FIG. 2. FIG. 2 is a diagram of the switching circuit 16 of an embodiment of the present disclosure. The switching circuit 16 has a voltage-trimming module 20, a mode-selecting circuit 22, a comparator 24 and a control module.

The voltage-trimming module 20 is to trim a pre-reference voltage Vpr to generate a reference voltage Vr. In other words, the voltage-trimming module 20 adjusts the pre-reference voltage Vpr to become the reference voltage Vr with a better precision.

The mode-selecting circuit 22 in the present embodiment comprises a resistor ladder 200 and a switch 202. The resistor ladder 200 has a first end to receive the reference voltage Vr, a second end connected to the ground potential GND and a voltage-dividing point to generate a working voltage Vw. Therefore, the working voltage Vw is a dividing voltage of the reference voltage Vr. The value of the working voltage Vw depends on the resistance of the resistor ladder 200. In other words, the reference voltage Vr and the working voltage Vw have a linear relationship. In other embodiment, other circuits that are able to receive and linearly divide a reference voltage to further generate a working voltage can be applied to the present disclosure as well.

The switch 202 receives both the reference voltage Vr and the working voltage Vw. The comparator 24 has a comparator output, a first input and a second input. The comparator 24 in the present embodiment is an operational amplifier, thus the comparator output is depicted as the symbol 'o' in FIG. 2, the first input is the non-inverting input depicted as the symbol '+' in FIG. 2, and the second input is the inverting input depicted as the symbol '−' in FIG. 2. The first input is connected to the output of the switch 202.

The control module substantially comprises an oscillator 26 and a pulse width modulator (PWM) 28. The oscillator 26 is to generate an oscillating signal 21. The pulse width modulator 28 is able to generate the control signal 11 according to the comparator output of the comparator 24 and the oscillating signal 21 to control the gate of the power MOSFET 14 to switch the group of LEDs 12.

The switching circuit 16 is able to perform a measuring mode and a working mode. FIG. 2 shows the switching circuit 16 in the measuring mode. During the measuring mode, the switch 202 transfers the reference voltage Vr to its output. Also during the measuring mode, the second input of the comparator 24 is connected to the comparator output to form a feedback structure. The feedback structure keeps the comparator 24 away from the effect of the external circuit, i.e. the pulse width modulator (PWM) 28. Thus, a measuring device (not shown), such as a probe, can perform the measurement on the first input without the effect of the external circuit, wherein the first input receives the reference voltage Vr during the measuring mode, as described above.

After the measurement is performed, an error between the reference voltage Vr and the desired reference voltage can be detected. The tolerable error substantially depends on the specification of the LED circuit. In an embodiment, the tolerable error between the desired reference voltage and the reference voltage Vr is between −0.3% and +0.3% of the desired reference voltage. In another embodiment, the tolerable error is between −0.5% and +0.5% of the desired reference voltage.

Figure 3:
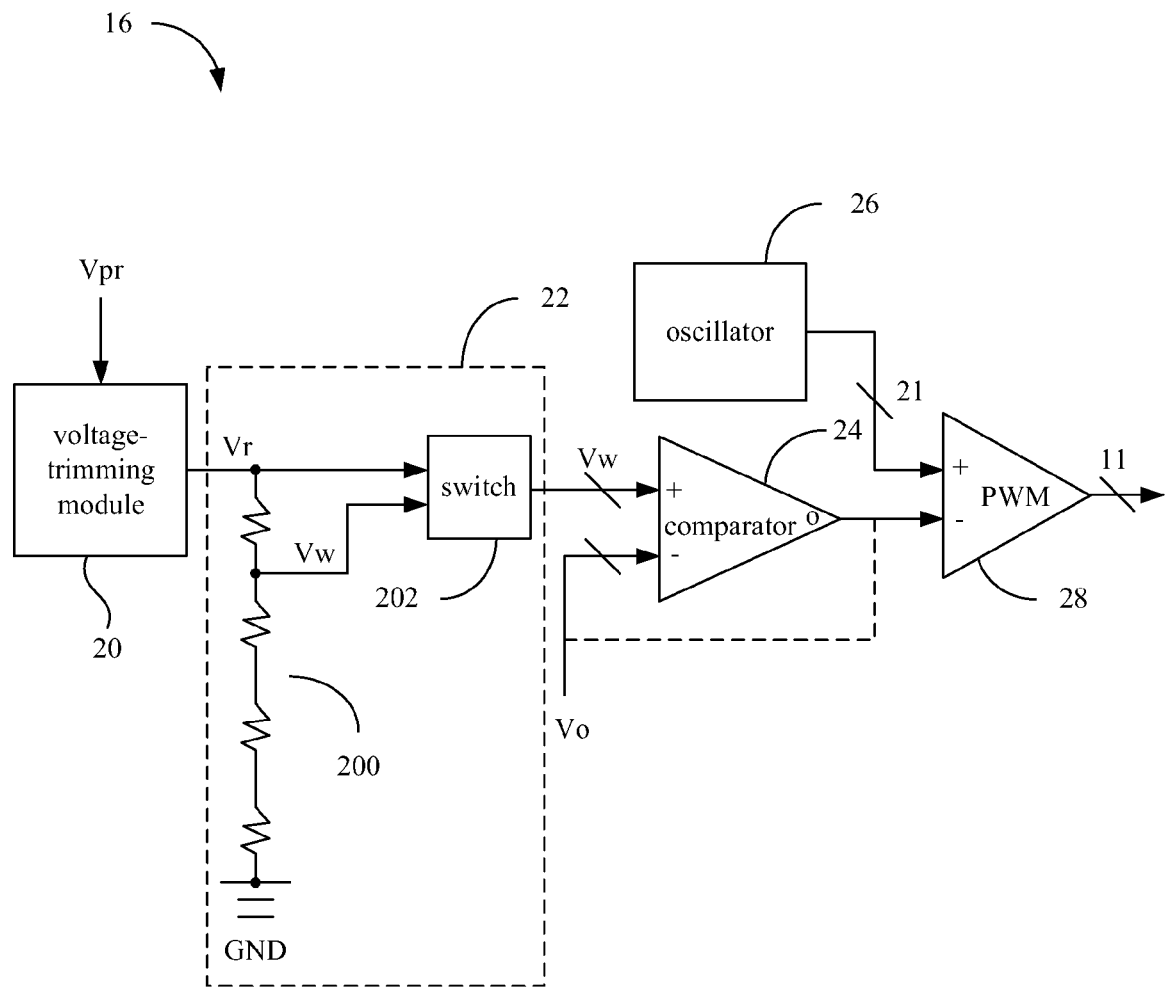
FIG. 3 is a diagram of the switching circuit in the working mode of an embodiment of the present disclosure.

When the reference voltage Vr is in the tolerable error range, one can adjust the reference voltage Vr by controlling the voltage-trimming module 20 until it falls in the tolerable error range. When the reference voltage Vr is in the tolerable error range, the switching circuit 16 can switch to the working mode. Please refer to FIG. 3. FIG. 3 is a diagram of the switching circuit 16 in the working mode of an embodiment of the present disclosure. During the working mode, the switch 202 transfers the working voltage Vw to its output. Because of the linearity of the resistor ladder 200, the working voltage Vw can be in the tolerable error range as well.

If one uses the measuring device to measure the working voltage Vw directly, it's easy to affect the measuring result since the working voltage is relatively smaller than the reference voltage. For instance, suppose that the desired reference voltage is 1V, the desired working voltage is 0.3V, and the tolerable range is between −0.3% and +0.3%. For the desired reference voltage, the tolerable range is from −30 mV to +30 mV. And for the target working voltage, the tolerable range is from −9 mV to +9 mV. If the measuring device makes a 10 mV error, the error made on the reference voltage may be still in the tolerable range, but the error made on the working voltage is definitely out of the tolerable range.

Further, during the working mode, the second input of the comparator 24 is connected to the output point of the LEDs 12 to receive the output voltage Vo. The control module is connected to the comparator output to generate the control signal 11 to control the power MOSFET 14 of the LED circuit to switch the group of LEDs during the working mode. The inductor 10, the group of LEDs 12, the power MOSFET 14 and the switching circuit 16 together form a feedback loop to restrict the output voltage Vo at a low level to avoid too much power dissipation on the load 18.

The mode-selecting circuit of the switching circuit in the present disclosure provides the measuring mode to measure the reference voltage and further trim the reference voltage if it is not in a tolerable error range of the desired reference voltage. When the reference voltage is in a tolerable error range, the smaller working voltage can be in the tolerable error range as well according to the linearity of the voltage-dividing module, such as a resistor ladder. Thus, the comparator can provide the output voltage and the reference voltage an accurate comparison.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A switching circuit adapted in an LED circuit comprising:
   a voltage-trimming module to generate a reference voltage;
   a mode-selecting circuit comprising:
      a voltage-dividing module to receive and linearly divide a reference voltage to further generate a working voltage; and
      a switch connected to the voltage-dividing module, wherein the switch has an output;
   a comparator comprising a first input connected to the switch, a second input and a comparator output; and
   a control module;
   wherein during a measuring mode, the switch transfers the reference voltage and the second input of the comparator is connected to the comparator output, such that the reference voltage is measured at the comparator output for the voltage-trimming module to adjust the reference voltage according to the measured result;
   during a working mode, the switch transfers the working voltage, the second input of the comparator receives an output voltage of the LED circuit and the control module generates a control signal according to the voltage of the comparator output to switch the LED circuit.

2. The switching circuit of claim 1, wherein the voltage-dividing module is a resistor ladder comprising:
   a first end to receive the reference voltage;
   a second end connected to the ground potential; and
   a voltage-dividing point to generate the working voltage.

3. The switching circuit of claim 1, wherein during the measuring mode, the tolerable error of the reference voltage is between −0.3% and +0.3% of a desired reference voltage.

4. The switching circuit of claim 1, wherein during the measuring mode, the tolerable error of the reference voltage is between −0.5% and +0.5% of a desired reference voltage.

5. The switching circuit of claim 1, wherein the control module comprises:
   an oscillator to generate an oscillating signal; and
   a pulse width modulator (PWM) to generate the control signal according to the comparator output and the oscillating signal to control the gate of a power MOSFET to switch a group of LEDs of the LED circuit.

6. The switching circuit of claim 1, wherein the power MOSFET switches the group of LEDs by performing charging and discharging activities on a capacitor of the LED circuit.

7. An LED circuit comprising:
   a load connected to a ground potential;
   a group of LEDs having an input point connected to a voltage supply and an output point connected to the load;
   a switching circuit comprising:
   a voltage-trimming module to generate a reference voltage;
   a mode-selecting circuit comprising:
   a voltage-dividing module to receive and linearly divide a reference voltage to further generate a working voltage;
   a switch connected to the voltage-dividing module, wherein the switch has an output;
   a comparator comprising a first input connected to the switch, a second input and a comparator output; and
   a control module; and
   a power MOSFET;
   wherein during a measuring mode, the switch transfers the reference voltage, the second input of the comparator is connected to the comparator output, such that the reference voltage is measured at the comparator output for the voltage-trimming module to adjust the reference voltage according to the measured result;
   during a working mode, the switch transfers the working voltage, the second input of the comparator receives an output voltage of the output point of the group of LEDs and the control module generates a control signal according to the voltage of the comparator output to control the gate of the power MOSFET to switch the group of LEDs of the LED circuit.

8. The LED circuit of claim 7, wherein the voltage-dividing module is a resistor ladder comprising:
   a first end to receive the reference voltage;
   a second end connected to the ground potential; and
   a voltage-dividing point to generate the working voltage.

9. The LED circuit of claim 7, wherein during the measuring mode, the tolerable error of the reference voltage is between −0.3% and +0.3% of a desired reference voltage.

10. The LED circuit of claim 7, wherein during the measuring mode, the tolerable error of the reference voltage is between −0.5% and +0.5% of a desired reference voltage.

11. The LED circuit of claim 7, wherein the control module comprises:
    an oscillator to generate an oscillating signal; and
    a pulse width modulator (PWM) to generate the control signal according to the comparator output of the comparator and the oscillating signal to control the gate of the power MOSFET to switch the group of LEDs.

12. The LED circuit of claim 7, wherein the power MOSFET switches the group of LEDs by performing charging and discharging activities on a capacitor of the LED circuit.

* * * * *